US005138287A

United States Patent [19]

Domokos et al.

[11] Patent Number: 5,138,287

[45] Date of Patent: Aug. 11, 1992

[54] HIGH FREQUENCY COMMON MODE CHOKE

[75] Inventors: John Domokos, Stirling, Scotland; Richard C. Walker, Palo Alto; William J. McFarland, Mt. View, both of Calif.

[73] Assignee: Hewlett-Packard Company, Palo Alto, Calif.

[21] Appl. No.: 522,287

[22] Filed: May 11, 1990

[51] Int. Cl.[5] .............. H04B 3/28

[52] U.S. Cl. .............. 333/12; 333/245

[58] Field of Search .............. 333/12, 24 R, 25, 26, 333/32, 33, 245, 181, 115, 116; 336/175, 195, 174; 330/258

[56] References Cited

U.S. PATENT DOCUMENTS

| | | | |
|---|---|---|---|
| 3,659,228 | 4/1972 | Napoli | 333/116 |
| 3,778,759 | 12/1973 | Carroll | 333/12 X |
| 3,979,699 | 9/1976 | Caragliano et al. | 333/116 |
| 4,121,180 | 10/1978 | Greenway | 333/25 X |
| 4,222,016 | 9/1980 | Stock et al. | 333/24 R |
| 4,591,812 | 5/1986 | Stegens et al. | 333/116 |
| 4,800,344 | 1/1989 | Graham | 333/25 |
| 4,980,654 | 12/1990 | Moulton | 333/24 R X |

OTHER PUBLICATIONS

Weirather, "A Small MIC Coupler With Good Directivity", IEEE Trans. on Microwave Theory & Tech., Jan. 1974, pp. 70–71.

Sekhri, "Power Line Filter", IBM Tech. Discl. Bulletin, vol. 17, No. 7, Dec. 1974, pp. 1998, 1999.

"Classical Electrodynamics", John David Jackson, John Wiley and Sons, Inc., (1967), page 198.

Richard E. Matick, "Transmission Line Pulse Transformers—Theory and Applications", *Proceedings of the IEEE*, vol. 56, No. 1, Jan. 1968, pp. 47–62.

C. Norman Winningstadt, "Nanosecond Pulse Transformers", *IRE Trans. Nuclear Science*, vol. NS-6, Mar. 1959, pp. 26–31.

Patent Abstracts for U.S. Pat. No. 4,739,289.

*Primary Examiner*—Eugene R. LaRoche
*Assistant Examiner*—Seung Ham

[57] ABSTRACT

A choke for reducing common mode signals in high frequency circuits. A microstrip transmission line includes a pair of conductors spaced above a ground plane conductor. In input and output regions the conductors are spaced relatively far apart from each other such that each conductor presents a characteristic impedance that is similar for common mode and for differential mode signals. Between the input and output regions the conductors are located much closes together such that they present different characteristic impedances to common mode and to differential mode signals so as to reflect the common mode signal but not the differential mode signal. In another version a hole in the ground plane beneath the conductors is partially occupied by a conductive island that is coupled to the ground plane through a resistance to absorb the common mode signal rather than reflecting it. Other versions are realized in a pair of parallel coaxial cables and in a coplanar transmission line.

13 Claims, 8 Drawing Sheets

HIGH FREQUENCY COMMON MODE CHOKE

In the Figures, the first digit of a reference numeral indicates the first figure in which appears the element indicated by that reference numeral.

FIELD OF THE INVENTION

This invention relates in general to chokes and differential circuits and relates more particularly to chokes that can operate at high frequencies.

BACKGROUND OF THE INVENTION

In circuits having two input ports, the input signal can be divided into the sum of a common mode signal and a differential mode signal. A common mode choke is a circuit that blocks passage of the common mode component of an input signal. A typical existing common mode choke is illustrated in FIG. 1. It consists of a pair of wires 11 and 12 wound onto a ring 13 of ferromagnetic material. Wire ends 14 and 15 serve as a pair of input ports and ends 16 and 17 serve as a pair of output ports. At input ports 14 and 15 are applied input voltage $V_1$ and $V_2$, respectively. The common mode component of this signal is equal to $(V_1+V_2)/2$ and the differential mode signal is equal to $(V_1-V_2)/2$. The windings of the wire about ring 13 produces a self inductance $L_1$ in wire 11, a self inductance $L_2$ in wire 12 and a mutual inductance M between these two wires. For a current $I_1$ in wire 11 and $I_2$ in wire 12, the voltages and currents satisfy the relationships:

$$\Delta V_1 \equiv V_1 - V_3 = -L_1 \cdot \frac{dI_1}{dt} + M \cdot \frac{dI_2}{dt} \quad (1)$$

$$\Delta V_2 \equiv V_2 - V_4 = M \cdot \frac{dI_1}{dt} - L_2 \cdot \frac{dI_2}{dt} \quad (2)$$

When $L_1$, $L_2$ and M are equal, the mutual impedances counter the self inductances to eliminate the common mode component at the output ports 16 and 17. This can be seen by rewriting equations (1) and (2) in terms of common mode and differential mode components $\Delta V_c \equiv (\Delta V_1 + \Delta V_2)/2$, $\Delta V_d \equiv (\Delta V_1 - \Delta V_2)/2$, $I_c \equiv (I_1 + I_2)/2$ and $I_d \equiv (I_1 - I_2)/2$:

$$\Delta V_c = \left[(-L_1 + M)\cdot\frac{dI_1}{dt} + (M - L_2)\cdot\frac{dI_2}{dt}\right]/2 = \quad (3)$$

$$\left[(-L_1 - L_2 + 2M)\cdot\frac{dI_c}{dt} + (L_2 - L_1)\cdot\frac{dI_d}{dt}\right]/2 \rightarrow$$

$$(-L + M)\cdot\frac{dI_c}{dt} \text{ for } L_1 = L_2$$

and $$\Delta V_d = \left[(-L_1 - M)\cdot\frac{dI_1}{dt} + (M + L_2)\cdot\frac{dI_2}{dt}\right]/2 = \quad (4)$$

$$\left[(-L_1 + L_2)\cdot\frac{dI_c}{dt} + (-L_2 - L_1 - 2M)\cdot\frac{dI_d}{dt}\right]/2 \rightarrow$$

$$(-L - M)\cdot\frac{dI_d}{dt} \text{ for } L_1 = L_2 \equiv L$$

Thus, for $L_1 = L_2 \equiv L$, $\Delta V_c$ is proportional to $I_c$ and $\Delta V_d$ is proportional to $I_d$. For L+M much smaller than L, the impedance experienced by the common mode component is much larger than the impedance experienced by the differential mode component. Such large impedance experienced by the common mode component discriminates against this component. To the extent that the coupling coefficient $K \equiv -M/L$ is less than one, a common mode component will appear in the output. The sign of M can be reversed by reversing the direction that either of wires 11 and 12 is wound about ring 13, thereby converting this common mode choke into a differential mode choke.

When input port 15 of the common mode choke is grounded, the output voltages $V_3$ and $V_4$ on output ports 16 and 17 are opposite in sign and are equal in magnitude to one half of $V_1$. This version therefore functions as a splitter. When output port 17 is grounded, the output voltage $V_3$ is equal to $V_1 - V_2$. This version therefore functions as a combiner.

Unfortunately, the choke of FIG. 1 does not function effectively at high frequencies. In general, ferrite materials have permeabilities which fall off rapidly at frequencies above several megahertz. At frequencies on the order of 1 GHz or more, the small wavelength (on the order of or less than 4 inches) of the signals becomes comparable in the size to the discrete components of the common mode choke of FIG. 1, thereby enabling resonant effects to be important. For such small wavelengths, variations in spacing between windings and other components of that choke can produce resonant effects that result in large variations in operating characteristics, thereby making these devices unsuitable for use at such high frequencies.

In the article C. Norman Winningstadt, *Nanosecond Pulse Transformers*, IRE Trans. Nuclear Science, vol. NS-6, pp. 26–31, March 1959, a transformer is presented that utilizes distributed rather than lumped elements. As discussed in the article Richard E. Matick, *Transmission Line Pulse Transformers—Theory and Applications*, Proceedings of the IEEE., Vol. 56, No. 1, January 1968, pp. 47–62, the effects of unwanted "stray inductance and capacitance, if uniformly distributed, can be absorbed into the characteristic impedance of the transmission line, thus avoiding resonant points and providing a broadband device". This article analyzes the transmission of pulses in short (i.e., comparable in length to a pulse) and long transmission lines above a ground plane and applies this teaching to baluns and transmission line pulse transformers.

SUMMARY OF THE INVENTION

In accordance with the illustrated preferred embodiment, a choke is presented that is particularly suitable for use at frequencies above 1 GHz. This choke can be connected to function either as a common mode choke or as a differential mode choke. It transmits the low frequency components of the signal substantially undisturbed. This is particularly useful for digital signals in which a low frequency component is needed when a large number of 1's are grouped together in transmission of digital data.

An important application of this choke is to improve the risetime and overshoot specifications of data pulses produced by a differential output circuit. Most differential output stage designs have excessive overshoot on the falling edge and poor risetime on the rising edge. The common mode choke embodiment can be used to improve the overshoot specification by distributing part of the overshoot of the falling transition to the rising transition. This substantially halves the falling transition overshoot because it is shared by both of these transitions. Similarly, the very fast falling edge is coupled to the slower rising edge, thereby improving the slow risetime at the expense of the fast falltime.

There are two classes of embodiments of this choke. In a first class, a significant fraction of the unwanted mode signal is reflected back toward the signal source. This choke consists of a transmission line that exhibits a significantly different impedance for a differential mode signal than for a common mode signal. Beads, cores or poly-iron forms can be used to enhance the difference in impedance between the differential and common modes. One or more breaks in one of the transmission line's conductors can be included to substantially increase the impedance of the common mode component. Preferably, such breaks occur in the ground path of the choke so that it can transmit the low frequency components needed for digital data transmission.

The impedance of one of these modes is selected to match the impedance of input and output transmission lines to which the choke is connected. The mode for which the impedance is equal in both the choke and the transmission lines is transmitted and the mode for which these impedances do not match exhibits partial signal reflection. The fraction of signal reflected is equal to $(Z-Z_0)/(Z+Z_0)$, where Z is the impedance of the reflected mode and $Z_0$ is the characteristic impedance of the transmission lines. For transmission lines of 50 ohm characteristic impedance $Z_0$, some embodiments exhibit up to a 6:1 ratio of the impedances for the two modes. Embodiments of this choke exist for use with coaxial, microstrip and coplanar transmission lines.

Unfortunately, such reflected signals can interfere with the operation of devices connected to the input and the output of the choke. For example, when the choke is used at an input port of a test instrument, signals reflected from the input port can interfere with the operation of the device under test and reflections from the output port can interfere with the operation of circuitry within the test instrument. It would therefore be advantageous to absorb the unwanted mode instead of reflecting it. A second class of chokes is presented in which the unwanted mode is substantially absorbed instead of reflected.

DESCRIPTION OF THE PREFERRED EMBODIMENT

Figure 1:
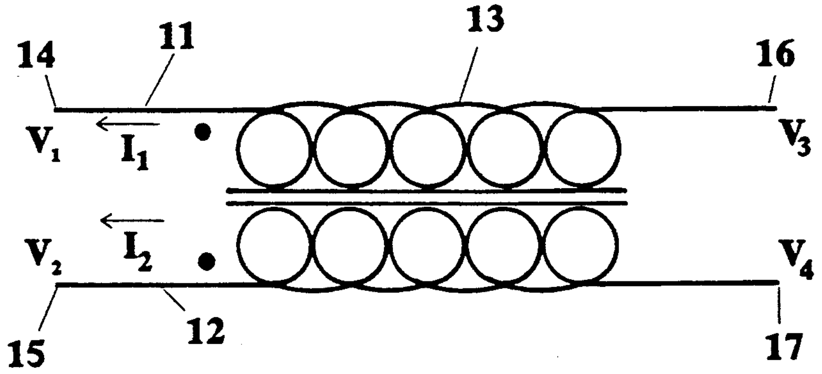
Figure 1 (Prior Art)
FIG. 1 illustrates a prior art, low frequency common mode choke.
Figure 2:
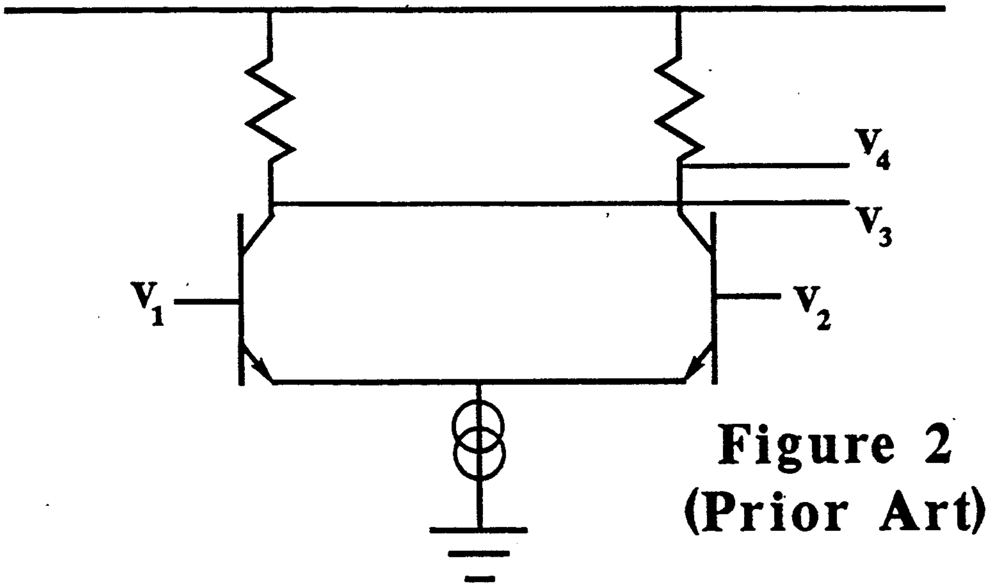
Figure 2 (Prior Art)
FIG. 2 illustrates a typical prior art differential mode output device.
Figure 3A:
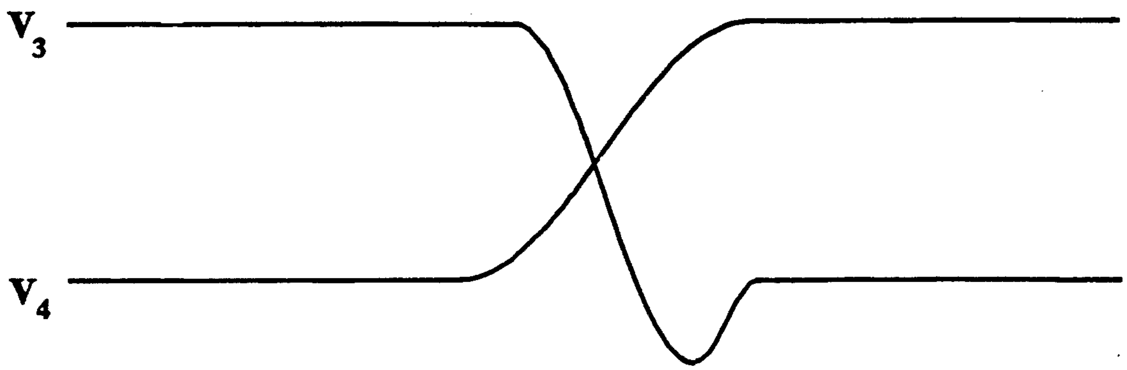
FIG. 3A illustrates the overshoot characteristic of the faster of the two transitions of a differential mode pair of signals.
Figure 3B:
FIG. 3B illustrates the common mode component of the signal of FIG. 3A.
Figure 3C:
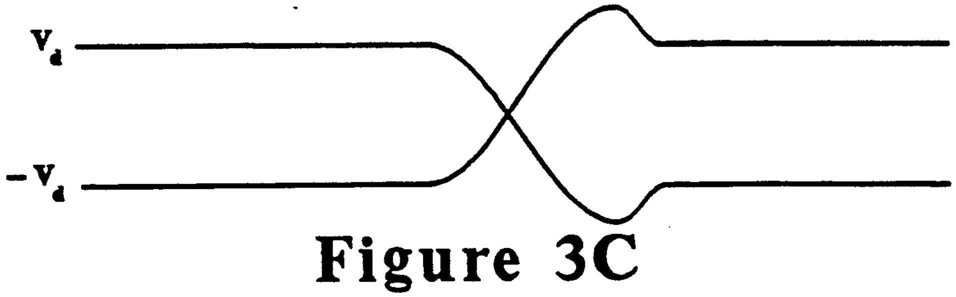
FIG. 3C illustrates the differential mode component of the signal of FIG. 3A.

In response to transition in a pair of differential mode input signals $V_1$ and $V_2$, the differential transistor pair in the device of FIG. 2 exhibits a fast falling transition with overshoot in an output signal $V_3$ and a slower rising transition with no overshoot in an output signal $V_4$ (see FIG. 3A). This becomes more noticeable as the amount of current in the differential pair is decreased. The low frequency components of the output pair $V_3$ and $V_4$ are substantially differential mode, but the transitions contain both common mode and differential mode components. That is, $V_3$ and $V_4$ can be represented as $V_c+V_d$ and $V_c-V_d$, respectively, where $V_c$ and $V_d$ are the common mode component shown in FIG. 3B and differential mode components, respectively, shown in FIG. 3C.

Figure 4:
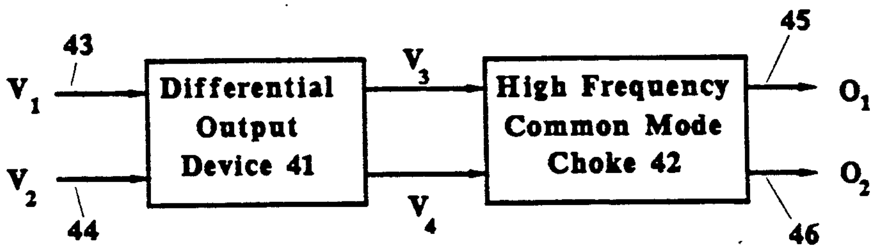
FIG. 4 illustrates a differential output device having improved symmetry between the two signals of this output, having improved transition time for the slower of the two components of this output signal and having reduced overshoot.

The common mode voltage $V_c$ predominantly consists of a high frequency component that is approximately sinusoidal over the interval of a transition and that is zero elsewhere. When $V_3$ and $V_4$ are passed through a high frequency common mode choke that substantially eliminates this high frequency common mode component, the resulting output signals are substantially equal to the differential mode signals $V_d$ and $-V_d$ shown in FIG. 3C. These output signals are much more symmetrical, exhibit a reduced rise time on the rising edge and a reduced overshoot on the falling edge. The maximum transition time and overshoot are reduced compared to the pair of signals of FIG. 3A. Therefore, the specifications of a differential circuit like that of FIG. 2 are improved by passing the output signals $V_3$ and $V_4$ through a high frequency common mode choke. Such a circuit is illustrated in FIG. 4, where the output of a differential output device 41 is coupled through a high frequency common mode choke 42 to provide output signals $O_1$ and $O_2$ in which the high frequency common mode component of the signals $V_3$ and $V_4$ have been substantially eliminated. The resulting signals have lower peak overshoot, faster risetime and greater symmetry.

When an input signal $V_1$ is applied to a first input port 43 and a second input port 44 of the common mode choke is grounded, the output voltages $V_3$ and $V_4$ on output ports 16 and 17 are opposite in sign and are equal in magnitude to one half of $V_1$. This version therefore functions as a splitter. When a first output port 45 is grounded and input signals $V_1$ and $V_2$ are applied to input ports 43 and 44, respectively, the output voltage $V_3$ is equal to $V_1-V_2$. This version therefore functions as a combiner.

Figure 5:
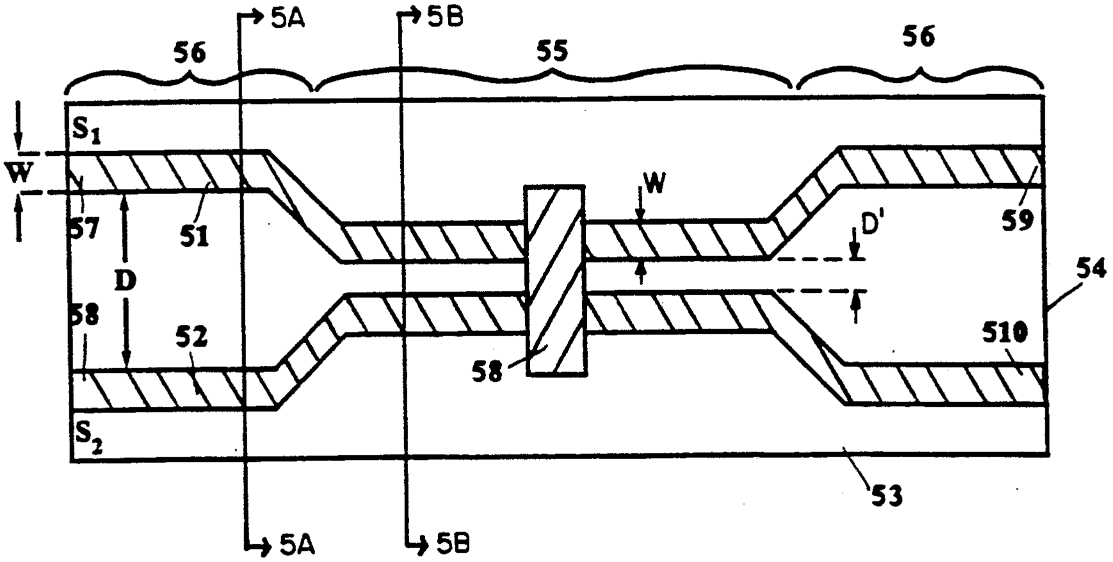
FIG. 5 is a top view of an embodiment of a common mode choke according to the invention in a microstrip transmission line.
Figure 5A:
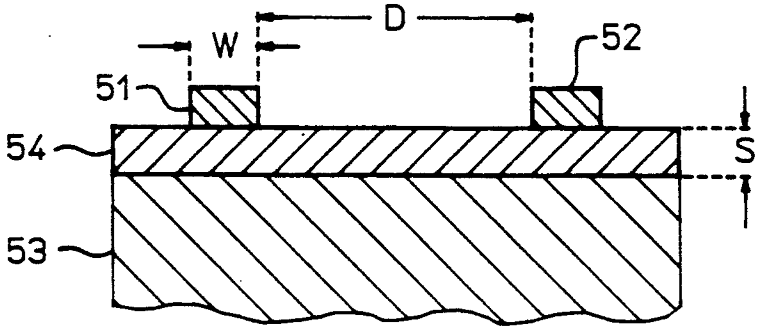
FIG. 5A is a sectional view taken along the line 5A—5A of FIG. 5.
Figure 5B:
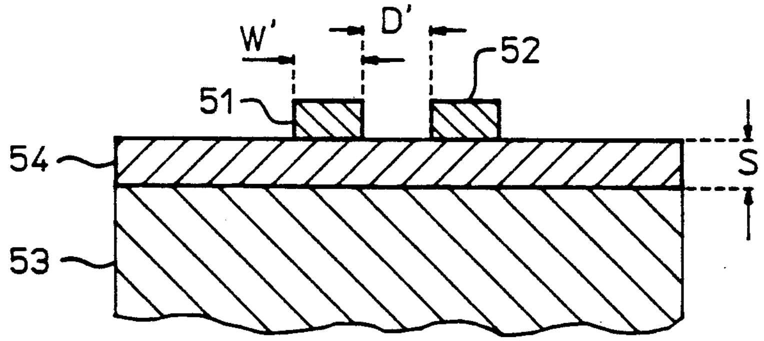
FIG. 5B is a sectional view taken along the line 5B—5B of FIG. 5.

A high frequency common mode choke that is useful for digital transmission at greater than 1 GHz clock rates is illustrated in FIG. 5. This choke consists of a microstrip conductor transmission line having a pair of microstrip conductors 51 and 52 separated from a conductive ground plane 53 by one or more intermediate nonconducting layers 54. Each of the conductors 51 and 52 has a width W. Each conductor is spaced apart from the ground plane 53 by a distance S; this distance S is in general equal to the thickness of the nonconducting layer or layers 54. Each conductor exhibits a characteristic impedance $Z_0$. The magnitude of $Z_0$ is determined in part by the width W of the conductor and the distance S between the conductor and the ground plane. The conductors 51 and 52 are spaced apart from each other by a distance D in input and output regions 56. This distance D between the two conductors is at least about three times larger than the distance S between the ground plane and the conductors. This relatively large distance between the conductors substantially prevents signal coupling between the conductors.

In region 55, microstrip conductors 51 and 52 are separated by a reduced distance D' that is on the order of the width W' of microstrip conductors 51 and 52 in that region so that there is significant coupling between signals in these two lines. The inductive coupling $L_c$ between these two lines for the common mode component of a pair of input signals $S_1$ and $S_2$ is larger than the inductive coupling $L_d$ for the differential mode component. That this is true can be seen from the following considerations. As indicated on page 198 of the text *Classical Electrodynamics* by John David Jackson, John Wiley and Sons, Inc., 1967, the magnetic field energy of a current carrying elements can be expressed as:

$$\sum_{i=1}^{n} L_i I_i^2/2 + \sum_{i,j=1}^{n} M_{ij} I_i I_j/2 \qquad (5)$$

Thus, the values of self inductance $L_i$ and mutual inductance $M_{ij}$ are proportional to the magnetic field energy produced by these inductive elements. Because a differential mode signal corresponds to antiparallel currents in microstrip conductors 51 and 52 in region 55, these currents produce fields that add destructively in most regions thereby producing a smaller total field energy than the field produced by the parallel currents of a common mode signal.

These results are particularly easy to see for the case of two magnetically coupled inductors (i.e., the case n=2). For this case, equation (5) for the magnetic field energy $E_H$ becomes:

$$E_H = L_1 I_1^2/2 + L_2 I_2^2/2 + M_{12} I_1 I_2. \qquad (5')$$

For a common mode signal $I_{cm}$, $I_2 = I_1 \equiv I_{cm}$, so that equation (5') becomes $E_H=(L_1+L_2+2M_{12})\cdot I_{cm}^2/2$. For a differential mode signal $I_{dm}$, $I_2=-I_1\equiv-I_{dm}$, so that equation (5') becomes $E_H=(L_1+L_2-2M_{12})\cdot I_{dm}^2/2$. For a given energy $E_H$, the effective inductance is defined as $L_{eff}\equiv 2\cdot E_H/I^2$ so that the effective inductance $L_{cm}$ for a common mode signal is $L_{cm}=(L_1+L_2+2M_{12})/2$ and for a differential mode signal is $L_{dm}=(L_1+L_2-2M_{12})/2$. Since the square of the impedance $Z_0$ of a transmission line is equal to the effective impedance $L_{eff}$ per unit length of the transmission line divided by the capacitance per unit length C, the characteristic impedance of a transmission line carrying a common mode signal is larger than the characteristic impedance of a transmission line carrying a differential mode signal.

Ideally, this common mode choke transmits substantially all of the differential mode component while reflecting as much of the common mode component as possible. Because there is substantially no interaction within regions 56 of the signals $S_1$ and $S_2$, the common mode and differential mode components of these two signals will experience the same characteristic impedance $Z_0$. Because spatial variation of the characteristic impedance of microstrip conductors 51 and 52 produces reflection of part of the input signal, the characteristic impedance of microstrip conductors 51 and 52 for a differential mode signal should be kept equal to $Z_0$ in the region 55 and in the regions 56. Therefore, the width of microstrip conductors 51 and 52 is varied as a function of the separation between microstrip conductors 51 and 52 to keep constant the characteristic impedance $Z_{0d}$ for the differential mode component. The inductance per unit length and the capacitance per unit length for signals $S_1$ and $S_2$ are all functions of the width of the microstrip conductors and the separation between them. Therefore, the effects of the width and the separation on both the inductance per unit length and the capacitance per unit length need to be taken into account in selecting the spatial variations of width and separation. These effects can easily be calculated numerically to achieve a value of $Z_{0d}$ that does not vary spatially.

Because the capacitance per unit length between microstrip conductors 51 and 52 is the same for both common and differential modes and because the inductance per unit length within region 55 is larger for a common mode signal than for a differential mode signal, within this region the characteristic impedance $Z_{0c}$ for a common mode signal will be larger than for the differential mode signal. This results in the reflection of a fraction $(Z_{0c}-Z_0)/(Z_{0c}+Z_0)$ of the common mode component without any significant reflection of the differential mode signal.

Because it is advantageous to reflect as much of the common mode signal as possible, the ratio $(Z_{0c}-Z_0)/(Z_{0c}+Z_0)$ should be as large as possible. This can be improved by the inclusion of ferromagnetic elements within region 55 to increase the inductive coupling of the common mode component. For example, a ferrite ring that encircles microstrip conductors 51 and 52 and is conductively insulated from these microstrip conductors will increase $Z_{0c}$ within region 55 without changing $Z_{0d}$ within this region or significantly affecting $Z_{0c}$ and $Z_{0d}$ within regions 56. $Z_{0d}$ is unaffected because the net current through ring 58 is zero for the differential mode current, thereby producing no net change in the circulation of B field within ring 58. However, the net current through ring 58 is nonzero for the common mode component so that the inductance increases for this mode, thereby further increasing $Z_{0c}$ within region 55.

Figure 6:
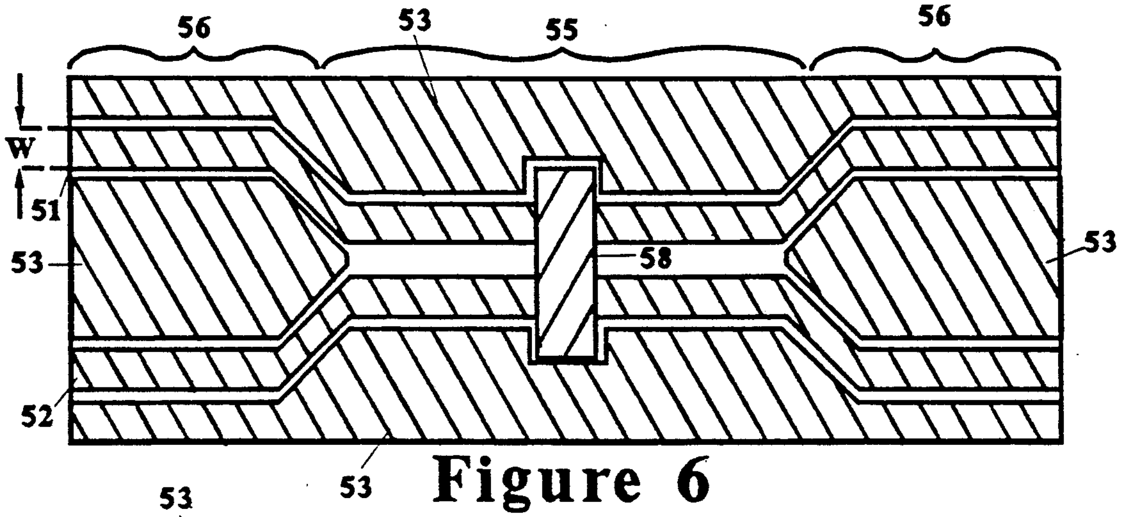
FIG. 6 illustrates a coplanar transmission line embodiment of a common mode choke suitable for use at frequencies that include above 1 GHz components.
Figure 7A:
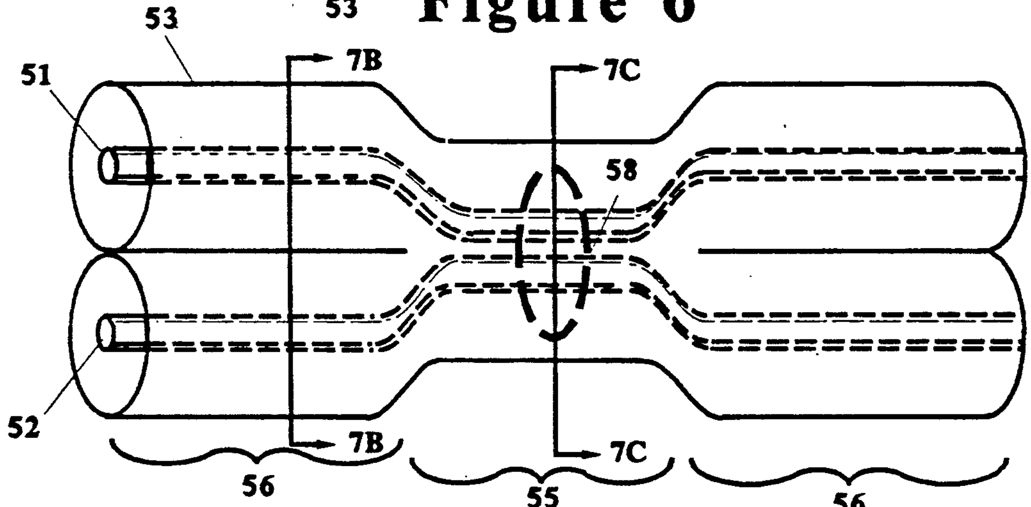
FIGS. 7A-7C illustrate a coaxial transmission line embodiment of a common mode choke suitable for use at frequencies that include above 1 GHz components.
Figure 7B:
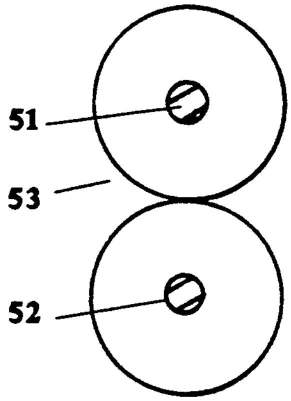
Figure 7C:
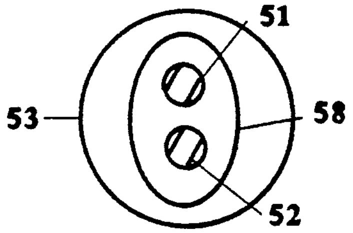

FIGS. 6 and 7A–7C show equivalent embodiments of the common mode choke in coplanar and coaxial transmission line technologies, respectively. The same reference numerals are used in all three embodiments for comparable elements to show the equivalence of all three embodiments. In FIG. 6, the ground conductor 53 is a conductive sheet that is coplanar with signal conductors 51 and 52. In FIGS. 7A–7C, conductors 51 and 52 are the center conductors of a pair of coaxial transmission lines and conductor 53 is the outer conductor of these two coaxial transmission lines. As illustrated in FIG. 7B in regions 56, conductor 53 consists of a pair of cylindrical conductors that are attached at a point of contact. As illustrated in FIG. 7C, in region 55, these two tangent cylindrical shells open at their point of contact to produce a single chamber that encloses both center conductors 51 and 52, thereby making the separation between the conductors less in the region 55 than in the regions 56. As in the embodiment of FIG. 5, a ferromagnetic ring 58 can be included that encircles conductors 51 and 52 within region 55 to increase further the characteristic impedance $Z_{0c}$ of the common mode component within region 55.

Figure 15:
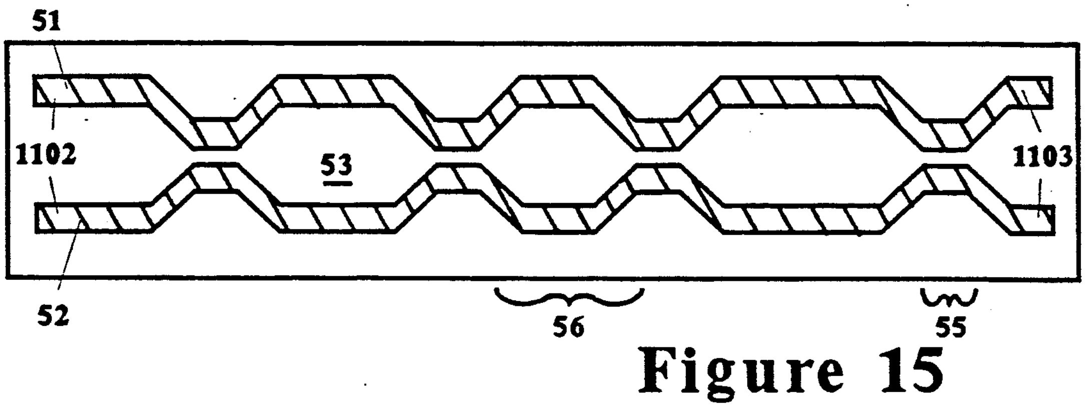
FIG. 15 illustrates a reflection type common mode choke having a plurality of reflection regions to enhance the fraction of an input common mode signal that is reflected.

Unfortunately, in all three of the above embodiments, it is difficult to get the impedance $Z_{0c}$ substantially above $Z_0$ in region 55. For such a situation, the fraction of the common mode signal that is reflected is small. In order to improve the performance when a single discontinuity in the characteristic impedance of the transmission line is small, multiple discontinuities can be used at determined spacing. These multiple discontinuities form an interference filter for the common mode signal. The amount of filtration and frequency band over which the filter operates can be controlled by the spacing and size of the discontinuities. This structure is illustrated in FIG. 15 and is also discussed further below in regard to FIG. 11.

Figure 8A:
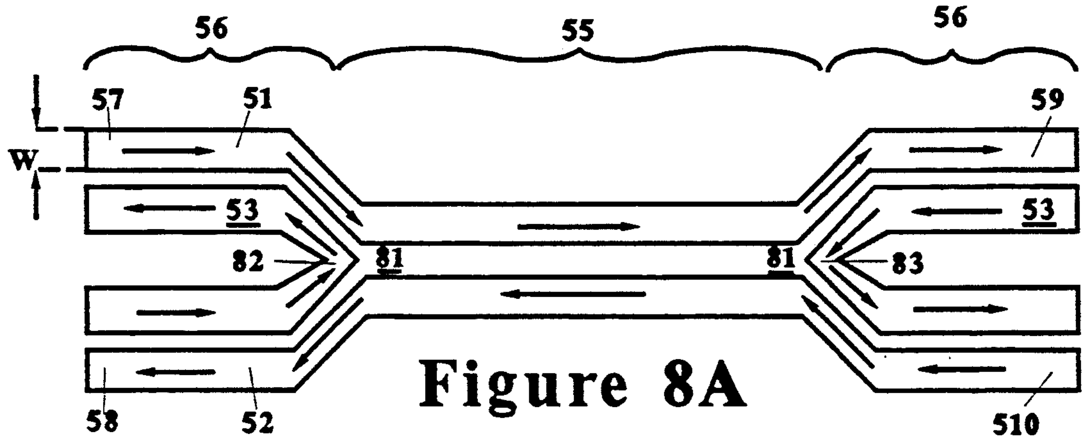
FIG. 8A illustrates, for a differential mode signal, the flow of current in the ground conductor of a coplanar transmission line embodiment of a split-ground type of common mode choke.

The following two classes of embodiments can be used to increase the amount of reflected signal from a given discontinuity. In a split-ground class of embodiments, illustrated in FIGS. 8A and 8B for a coplanar conductor transmission line embodiment, one or more breaks 81 are introduced into ground conductor 53. As illustrated in FIG. 8A, for a differential mode signal, there are complete current paths for the currents in microstrip conductors 51 and 52 as well as the associated mirror currents in the ground conductor sections 53. That is, in the ground conductors, at both nodes 82 and 83, there is both an input path and an output path for the portion of the differential mode current in the ground plane conductor 53.

Figure 8B:
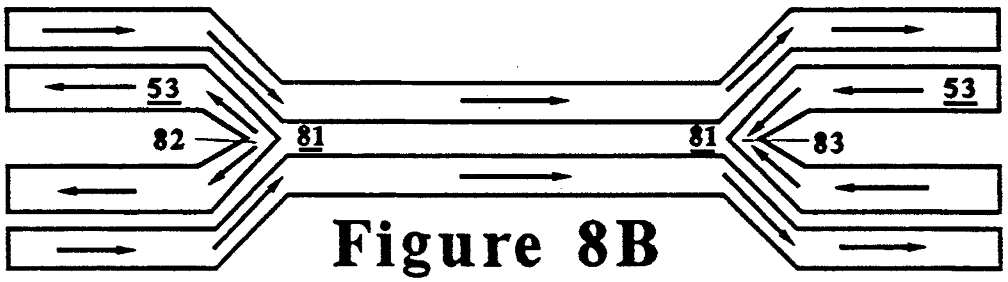
FIG. 8B illustrates, for a common mode signal, the flow of current in the ground conductor of a coplanar transmission line embodiment of a split-ground type of common mode choke.
Figure 9:
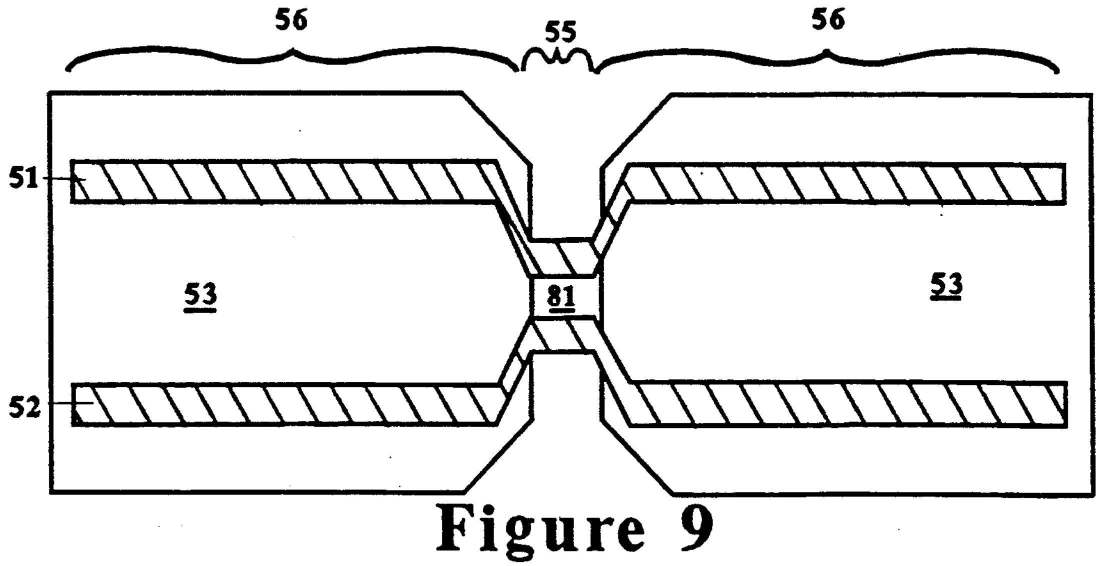
FIG. 9 illustrates a microstrip transmission line embodiment of a split-ground type of common mode choke.
Figure 10:
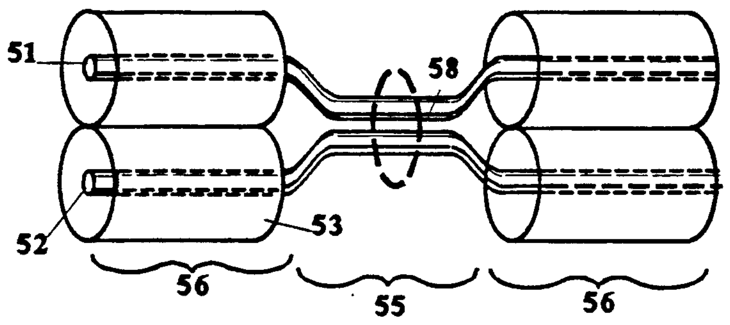
FIG. 10 illustrates a coaxial transmission line embodiment of a split-ground type of common mode choke.

At nodes 82 and 83 in FIG. 8B, it can be seen that the common mode currents violate Kirchoff's current law. Therefore, common mode currents cannot be carried by the ground conductor 53. This forces the common mode mirror currents to be carried by ground paths remote from microstrip conductors 51 and 52. This produces a characteristic impedance $Z_{0c}$ in regions 56 on the order of the 300 ohm characteristic impedance for a single wire that is remote from all other conductors. The widths of, and separation between, the conductors 51–53 are varied spatially such that the differential mode impedance $Z_{0d}$ is substantially constant (preferably at 50 ohms). The relative lengths of regions 55 and 56 can be freely selected. In particular, region 55 can be arbitrarily short and the lengths of regions can be selected to control interference between the reflected signals from the various discontinuities in the common mode impedance $Z_{0c}$. FIGS. 9 and 10 illustrate analogous split-ground embodiments for microstrip and coaxial transmission line embodiments.

Figure 11:
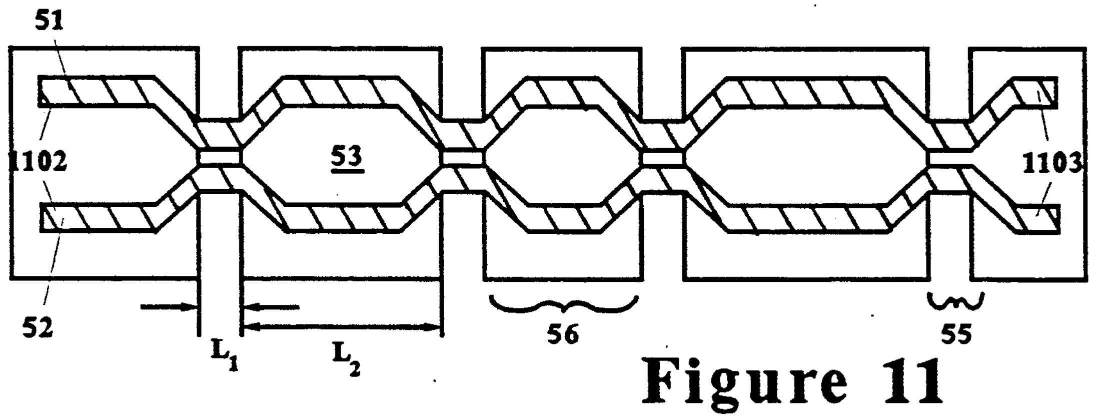
FIG. 11 illustrates a reflection type common mode choke having a plurality of reflection regions to enhance the fraction of an input common mode signal that is reflected.

The amount of reflected signal can be increased by the inclusion of a multiplicity of regions 55. This design is illustrated in FIG. 11 for a microstrip transmission line, but is clearly applicable to the other types of transmission line embodiments. Because the length of the common mode choke at the high frequencies of interest can be comparable to or longer than the wavelength for such frequencies, interference effects can be significant. In the embodiment of FIG. 11, input port 1102 and output port 1103 will generally have a 50 ohm characteristic impedance. The lengths $L_1$ and $L_2$ can be selected to maximize the amount of signal rejection at a selected frequency $f_0$, such as the frequency of the fundamental sinusoidal component of the sine-like signal between points A and B in FIG. 3B. Other embodiments are also possible that have peak common mode rejection at a set of n design frequencies $f_1, \ldots, f_n$. This can be achieved by varying the lengths, conductor widths and conductor spacings of the sections of the choke. Such analysis is well known from standard interference theory.

There are applications in which the signals reflected from the input and output ports of the choke will interfere with the operation of devices coupled to those ports. If any of the input and output loads coupled to the input and output ports of any of the above embodiments is not exactly 50 ohms, then multiple reflections can result. Because one of these loads is often part of a device under test, the value of this load is not controlled by the manufacturer of the above embodiments so that such load will often not be 50 ohms. In such applications, it is advantageous to absorb the common mode signal instead of reflecting it.

Figure 12:
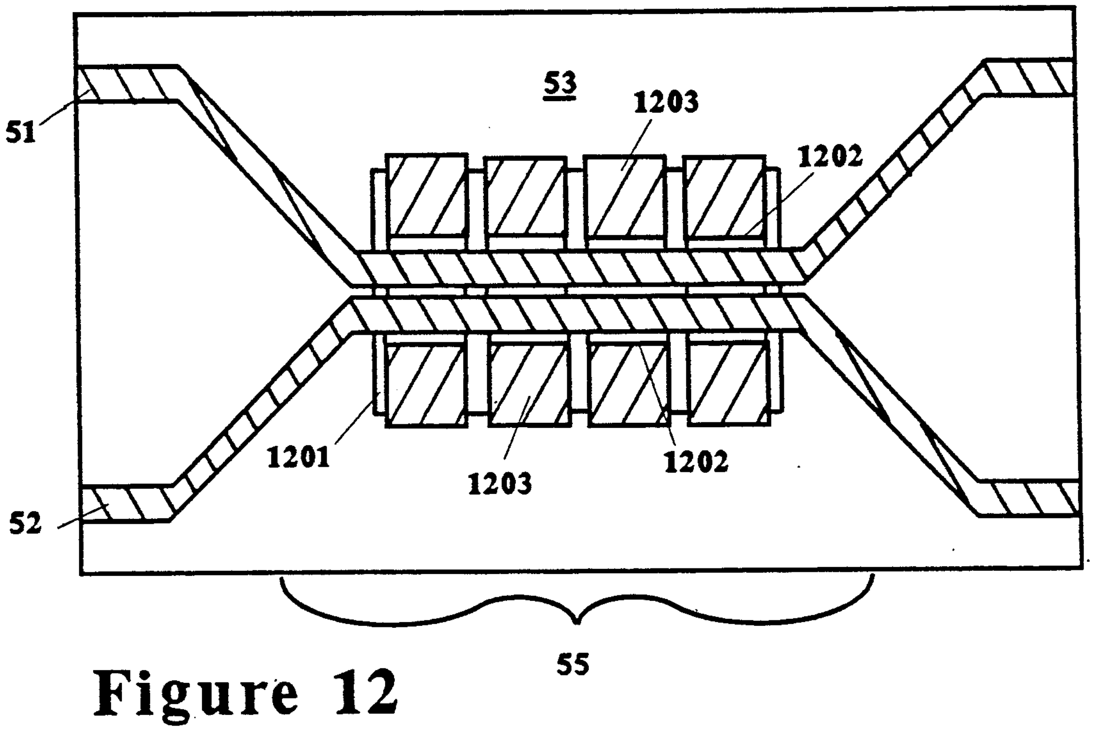
FIG. 12 is a microstrip transmission line embodiment of an absorption type of common mode choke.

FIG. 12 illustrates a microstrip transmission line embodiment of a choke in which the common mode component of an input signal is absorbed. This embodiment differs from the embodiment of FIG. 5 by the addition of a rectangular hole 1201 in the ground plane. Within this hole are one or more conductive islands 1202, each of which is centered laterally under microstrips 51 and 52 within region 55 and insulated from these microstrips by the substrate. Each of conductive islands 1202 is connected to ground plane 53 by a pair of resistors 1203. Resistors 1203 can be arbitrarily adjusted to tailor loss characteristics. For a differential mode signal, each island remains at ground potential so that no power is dissipated through these resistors. However, for a common mode signal, the potential of each island will vary away from ground potential, thereby producing a dissipative flow of current from the islands to the ground plane. When there are a plurality of islands, the gap between adjacent islands should be small enough that it does not introduce a significant discontinuity into the characteristic impedances $Z_{0c}$ and $Z_{0d}$ in region 55. Each island should be much shorter than a half wave of the highest frequency of operation to avoid undesirable resonances.

Figure 13:
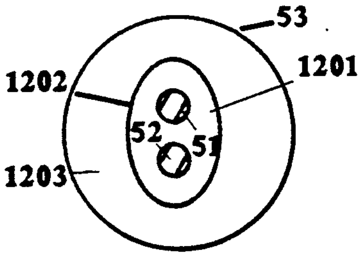
FIG. 13 is a cross-section of a coaxial transmission line embodiment of an absorption type of common mode choke.

A transmission line embodiment of this common mode absorptive-type choke is substantially like that in FIG. 7A except that, in region 55, the cross-section is as shown in FIG. 13 instead of as in FIG. 7C. FIG. 13 illustrates that, within region 55, this choke includes a nonconductive spacer 1201 that is encircled by a conductive cylinder 1202 and a resistive spacer 1203. As in the embodiment of FIG. 12, when a common mode signal passes along center conductors 51 and 52, the potential of ring 1202 will vary away from ground, thereby producing a dissipative current through resistor 1203 to outer conductor 53.

Figure 14:
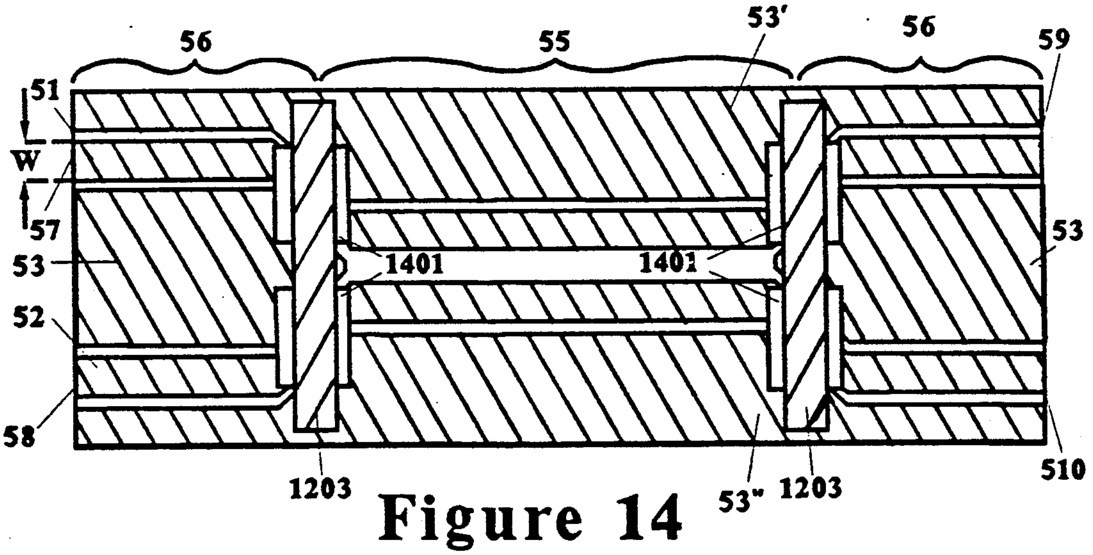
FIG. 14 is a coplanar transmission line embodiment of an absorption type of common mode choke.

FIG. 14 illustrates an absorptive-type common mode choke for use with coplanar transmission lines. A pair of resistive strips 1203 are connected to each of conductors 53, 53' and 53" so that a common mode signal produces currents within these resistive strips that damp the common mode signal. Insulating layers 1401 prevent these resistive strips from making electrical contact with conductive lines 51 and 52.

Figure 16:
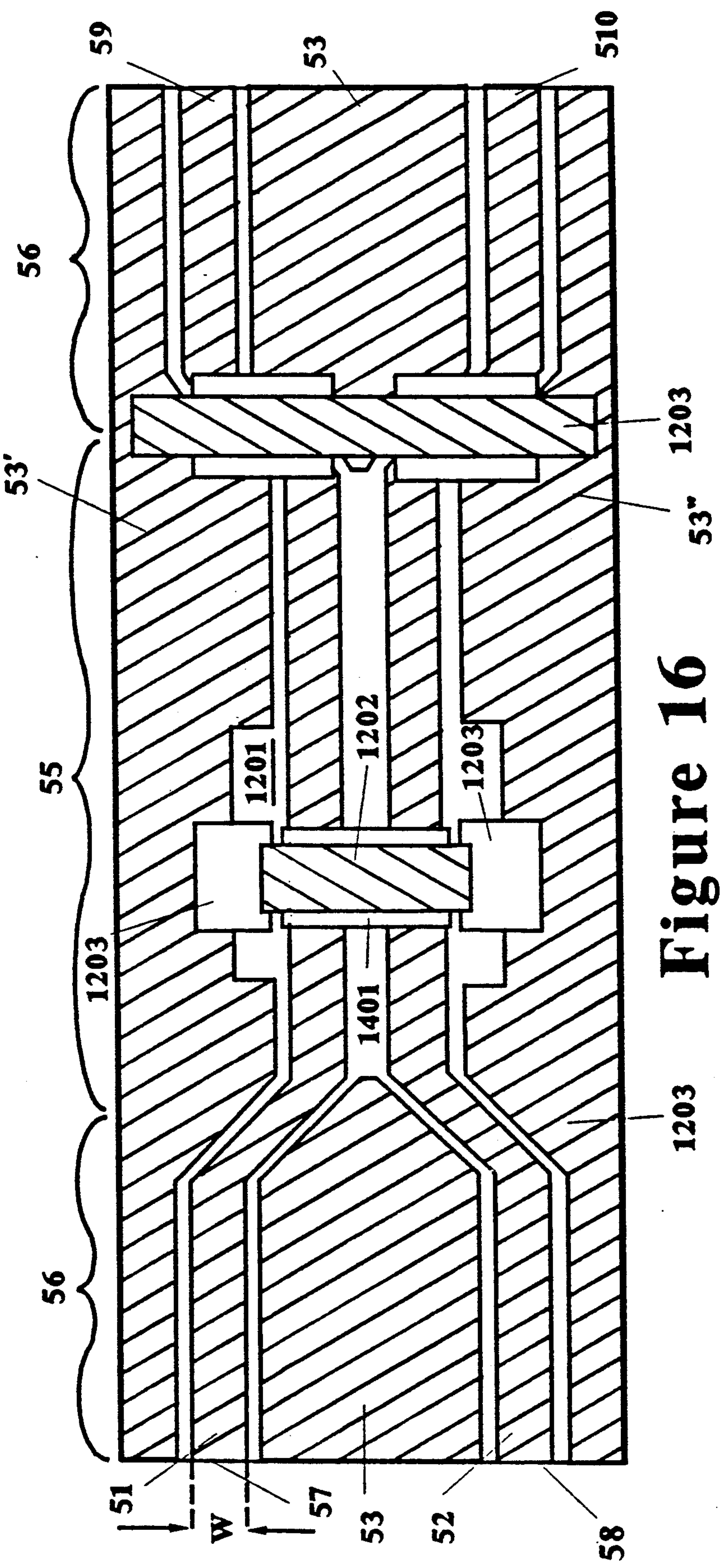
FIG. 16 illustrates an alternate coplanar transmission line embodiment of an absorption type of common mode choke.

FIG. 16 illustrates an alternate embodiment of an absorptive-type common mode choke for use with coplanar transmission lines. Analogous to the choke of FIG. 12, resistive elements 1203 are included to dissipate the common mode component. An insulating layer 1401 prevents resistive elements 1203 from making electrical contact with conductors 51 and 52. These resistive elements each make electrical contact with conductors 53, 53' and 53". Conductors 53 provide the functionality of islands 1202 in FIG. 12.

It should be noted that, although in all of the embodiments, the separation between the conductors 51 and 52 is larger in input and output regions 56 than in intermediate region 55, the opposite could be the case in the embodiments of FIGS. 5, 6, and 7A–7C. In such a case, the ferromagnetic element would still be located in the region where the separation is smaller. In this case, such region would be region 56. These alternate embodiments would still be designed such that the characteristic impedance $Z_{0d}$ within the input and output regions 56 matches the characteristic impedance $Z_{0d}$ of transmission lines to which this choke is to be coupled.

These common mode chokes can also be connected to operate as differential mode chokes. For example, in the common mode choke of FIG. 5, a pair of ports 57 and 58 are input ports for input signals $S_1$ and $S_2$, respectively. A pair of ports 59 and 510 function as the output ports of this common mode choke. However, if ports 57 and 510 are utilized as the input ports and ports 58 and 59 as the output ports, then this device will function as a differential mode choke. This is also true of the embodiments of FIGS. 6–15. Because the signals are travelling in opposite directions, a given embodiment of a given size will function properly only for selected frequencies.

We claim:

1. A choke comprising:

a ground conductor;

a first signal conductor adjacent the ground conductor and defining therewith a transmission line having a first input port and a first output port; and a second signal conductor adjacent the ground conductor and defining therewith a transmission line having a second input port and a second output port, the first and second conductors defining a signal path that can carry both direct current and alternating current and that is characterized by a common mode impedance and a differential mode impedance, the second conductor spaced apart from the first conductor in a first region by a distance that causes the common mode and differential mode impedances to be unequal to each other in the first region such that, when an alternating current having a common mode component and a differential mode component is carried by the signal conductors, one of the components of the alternating current is attenuated relative to the other component.

2. A choke as in claim 1 wherein the second conductor is spaced apart from the first conductor in a second region by a distance that causes the common mode and differential mode impedances to be substantially equal to each other in the second region.

3. A choke as in claim 1 and further comprising an annular ferromagnetic material around the conductors in the first region.

4. A choke as in claim 1 wherein the signal conductors comprise microstrip transmission lines and the ground conductor comprises a ground plane.

5. A choke as in claim 1 wherein the ground conductor surrounds the signal conductors coaxially.

6. A choke as in claim 1 wherein the signal conductors and the ground conductor are generally coplanar.

7. A choke as in claim 1 and further comprising a plurality of regions in alternate ones of which the second conductor is spaced apart from the first conductor by a distance that causes the common mode and differential mode impedances to be unequal to each other and in alternate ones of which the second conductor is spaced apart from the first conductor by a distance that causes the common mode and differential mode impedances to be substantially equal to each other.

8. A choke as in claim 1 wherein the ground conductor includes a nonconducting region that prevents a common mode signal from flowing in the ground conductor.

9. A choke as in claim 1 and further comprising means adjacent the signal conductors for absorbing a common mode signal.

10. A choke as in claim 9 wherein the means for absorbing a signal comprises:

a conductive island located in an opening defined in the ground conductor adjacent the signal conductors, the conductive island having an electric potential that is unaltered by a differential mode signal between the signal conductors and that is altered by a common mode signal between the signal conductors; and a resistive element connecting the island and the ground conductor.

11. A choke for carrying alternating current signals and direct current signals and selectively attenuating alternating current common mode signals, the choke comprising:

a ground conductor having a hole therethrough;

a first signal conductor overlying the ground conductor and the hole and forming a transmission line having a first input port and a first output port;

a second signal conductor spaced apart from the first conductor and overlying the ground conductor and the hole and forming a transmission line having a second input port and a second output port;

at least one conductive island located within said hole such that said island has an electrical potential that is unaltered by a differential mode signal between said first and second signal conductors and that is altered by an alternating current common mode signal between said first and second signal conductors; and at least one resistive element that connects each island to the ground conductor, the island and the resistive element operative to absorb said alternating current common mode signal between the first and second signal conductors.

12. A choke as in claim 11 wherein the first and second signal conductors are closer together adjacent to said island than within an input region and an output region away from said island.

13. A choke as in claim 12 wherein the first input port and the second output port are connected to an input signal source such that a common mode input signal provided by the source produces a differential mode signal within the choke and a differential mode input signal provided by the souce produces a common mode signal within the choke.

* * * * *